United States Patent [19]

Josef et al.

[11] 4,418,726
[45] Dec. 6, 1983

[54] DOUBLE LOOP SEAM FOR CORRUGATOR BELTS

[75] Inventors: Michael J. Josef, Clifton Park, N.Y.; Joseph D. Lanthier, Watervliet, N.Y.

[73] Assignee: Albany International Corp., Menands, N.Y.

[21] Appl. No.: 224,148

[22] Filed: Jan. 12, 1981

[51] Int. Cl.³ .................. D03D 25/00; D21F 1/12; D21F 7/10

[52] U.S. Cl. .................. 139/383 A; 24/31 H; 24/33 C; 28/141; 162/DIG. 1; 245/10

[58] Field of Search ....... 139/383 AA, 383 A, 425 A; 245/10; 28/141, 142; 24/33 C, 33 H, 31 H

[56] References Cited

U.S. PATENT DOCUMENTS

| | | | |
|---|---|---|---|
| 4,006,760 | 2/1977 | Romanski et al. | 139/383 AA |
| 4,103,717 | 8/1978 | Clark | 139/383 AA |
| 4,186,780 | 2/1980 | Josef et al. | 139/383 AA |

*Primary Examiner*—James Kee Chi
*Attorney, Agent, or Firm*—Kane, Dalsimer, Kane, Sullivan and Kurucz

[57] ABSTRACT

The disclosure is of a seam construction for multilayered corrugator belts. The construction comprises woven complementary seam-halves joined by pintles and in which each seam-half comprises 2 connectors, each being a single and a double layer zone mechanically bound by the nature of the weave and in which the crosswise yarns of each connector form alternately displaced loops on one edge thereof which can be intermeshed with like loops formed on the edge of the opposite connector. The connectors are attached to a step in each end of the multilayered corrugator belt.

1 Claim, 6 Drawing Figures

U.S. Patent   Dec. 6, 1983   Sheet 1 of 3   4,418,726
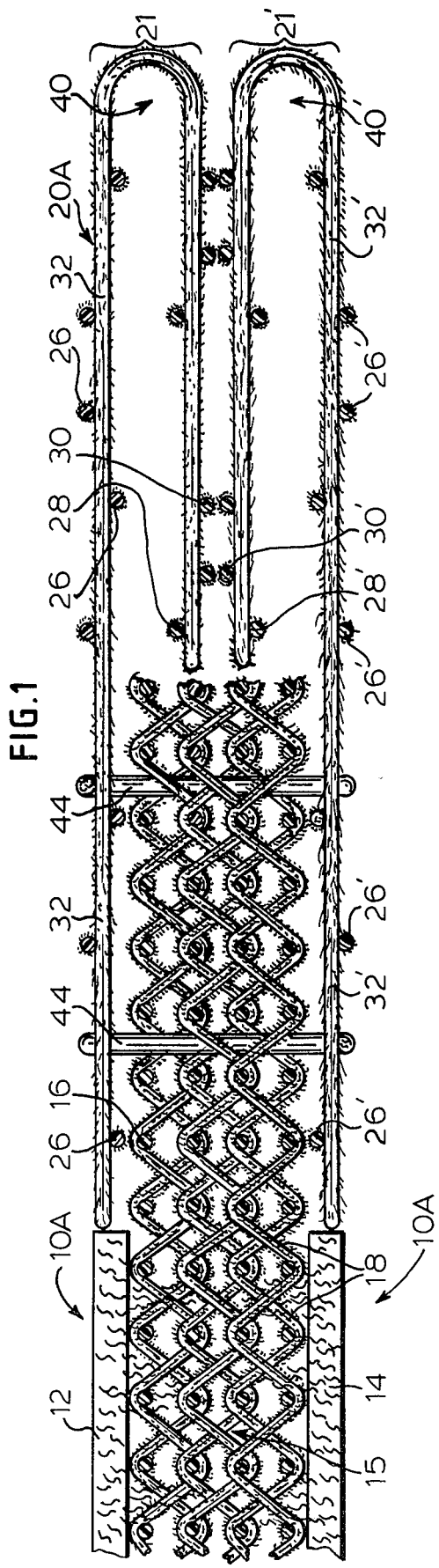
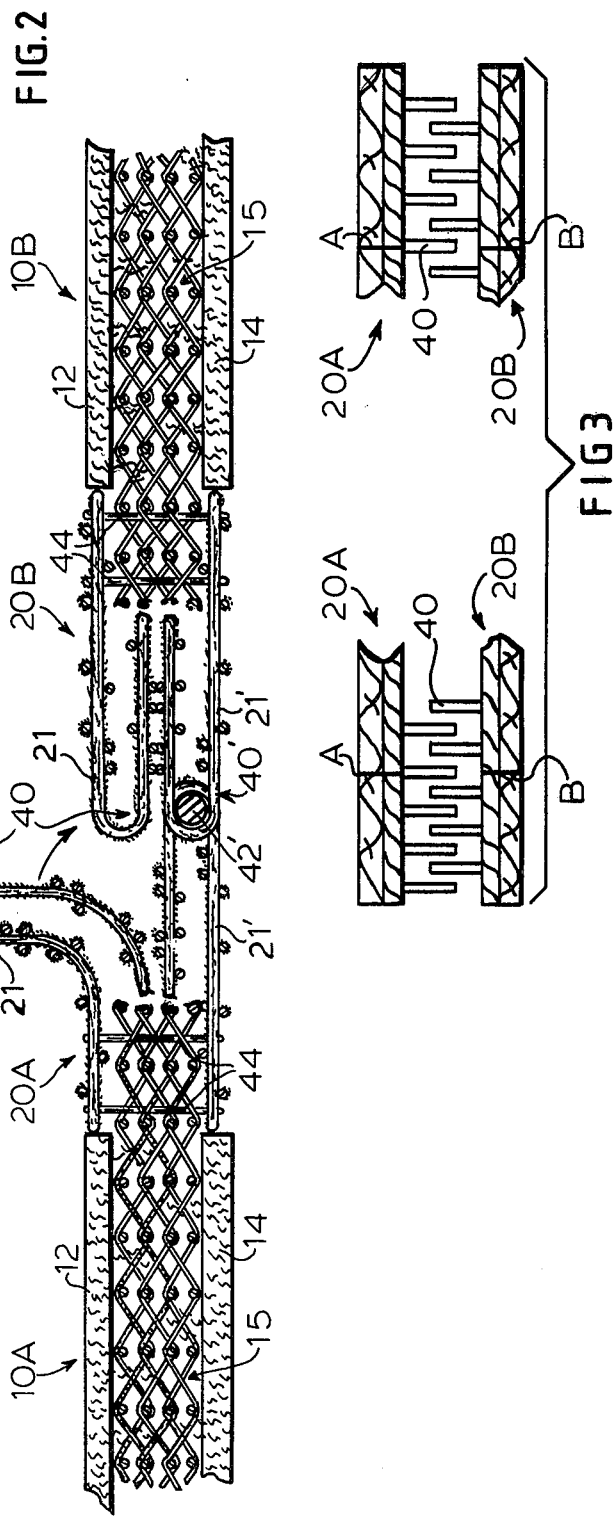

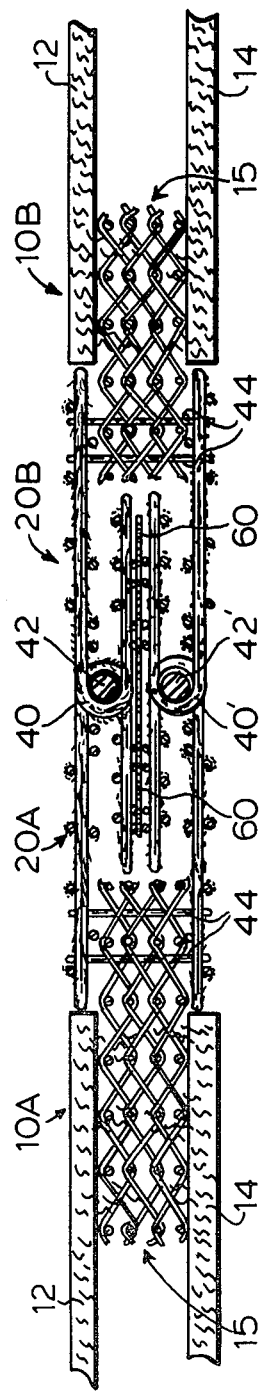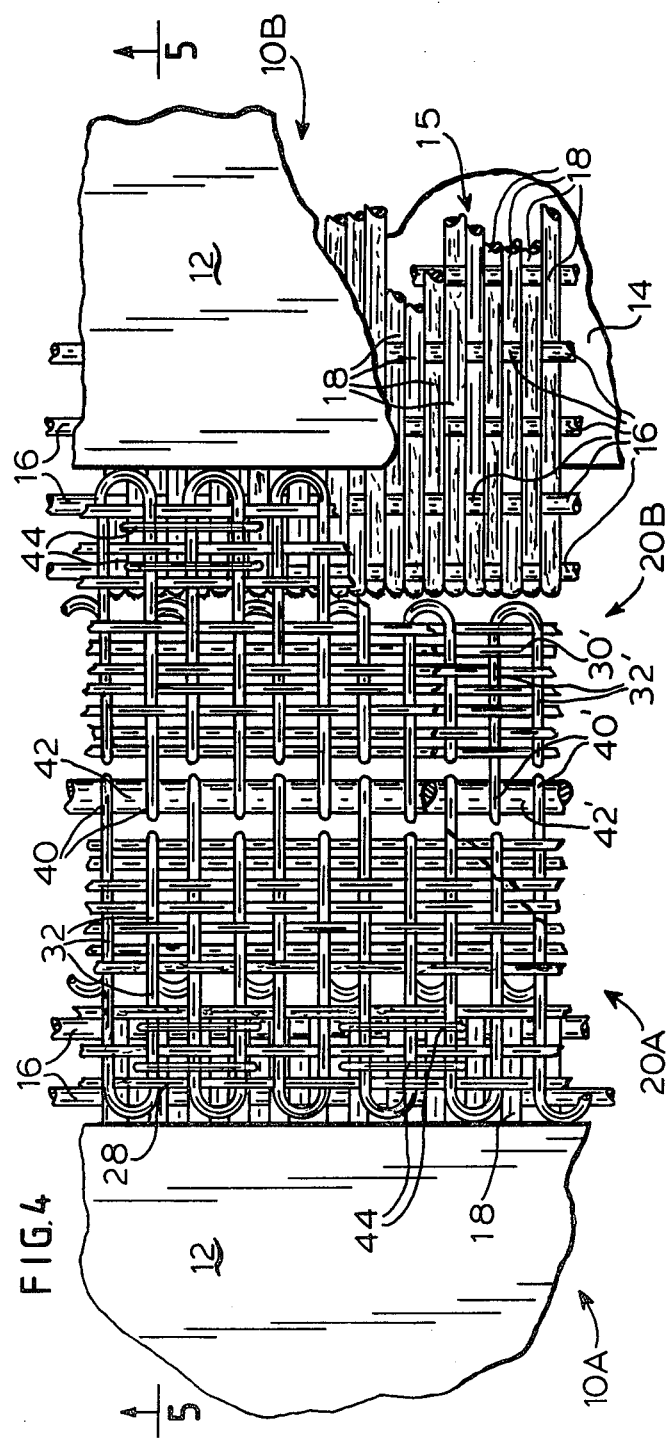

DOUBLE LOOP SEAM FOR CORRUGATOR BELTS

BACKGROUND OF THE INVENTION

1. Field of the Invention

The invention relates to a seam construction for joining the ends of a flat woven corrugator machine fabric to make it endless. More particularly, the invention relates to a seam construction for making endless, multilayer, flat woven corrugator belts.

2. Brief Description of the Prior Art

In general, the seam constructions of the prior art for seaming corrugator belts have not been entirely satisfactory for all purposes and applications. This is particularly true of seam constructions for corrugator belts which are relatively heavy caliper fabrics, fabricated from polymeric, non-metallic yarns. For example, one of the most common seams of the prior art for corrugator belts is the so-called "clipper seam". Clipper hooks are pressed into the ends of the flat woven fabric to make the joinder of the ends. The clipper hooks are the same hooks employed in the belt industry to make leather belts endless. The problem with the clipper seam on corrugator belts is related to its bulk. The clipper seam is subject to abrasion, wears out and often marks the board being manufactured. In addition, clipper seams are relatively weak seams and result in early belt failure dur to flex fatigue.

The seam construction of the present invention is substantially stronger than a clipper seam (2 to 3 times stronger), has a low profile, and joins the entirety of the multilayered construction. The seam is highly compact and flexible and easily bends when pressing over end rollers, without undue wear and tear on the seam. This is particularly important since corrugator belts are fabricated from fabrics of exceptional caliper (thickness) and are subject to flex fatigue and strain as they bend around rollers. The seam of the invention is non-marking and because it eliminates metal clipper hooks it reduces wear on the corrugator machine due to metal to metal contacts between the clipper hooks and metal parts of the machine.

SUMMARY OF THE INVENTION

The invention comprises a seam construction joining together two ends of a multilayered corrugator belt fabric which comprises;

a first end and a second end of a multilayered corrugator belt fabric, said multilayers including an upper layer and lower layer, said ends each having an upper step and a lower step therein by absence of portions of said upper and lower layers, each step being of a size adapted to mate with a corresponding step in a fabric seam-half connector described below;

a first fabric seam-half upper connector attached to the first end upper step, a second fabric seam-half upper connector attached to the second end upper step, a first fabric seam-half lower connector, attached to the first end lower step, and a second fabric seam-half lower connector attached to the second end lower step, said connectors each containing first, second and third warp systems and a single filling system, the first and second warp systems respectively providing with the filling, face and back weaves, the face weave covering the back weave for a portion thereof providing a double layer zone of an outer layer and an inner layer and the third warp system binding the face and back weaves together in the double layer zone, and the filing system woven in the folded position along an edge to enable said face weave to cover said back weave and to form alternately displaced protruding loops along said edge for intermeshing with like loops formed along the edge of the other of the first and second seam-half connectors attached to a corresponding step for receipt of a pintle through the intermeshed loops, each of the seam-half connectors having a step therein along the side opposite to the protruding loops, said step being effected by the absence of a portion of said inner layers of the double layer zone, each seam-half connector step being of a size adapted to mate with a corresponding step in one of the ends;

said seam-halves being joined by a pintle through the intermeshed loops of each of the upper and lower connectors;

the upper step of the first end being joined to the opposite step of the first fabric seam-half upper connector, the upper step of the second end being joined to the opposite step of the second seam-half upper connector, the lower step of the first end being joined to the opposite step of the first fabric seam-half lower connector and the lower step of the second end being joined to the opposite step of the second fabric seam-half lower connector;

said seam construction having a thickness about equal to the thickness of the corrugator belt fabric.

The invention also comprises the method of making the seam construction of the invention.

The term "corrugator belt" as used herein means a special textile belt of the high strength variety, used to bond corrugator medium and liner board together. Corrugator belts are used on a section of a corrugator machine to aid in the drying of the glue used to bond liner and medium together.

BRIEF DESCRIPTION OF THE DRAWINGS

FIG. 1 is a cross-sectional, enlarged side elevation of the end of a corrugator belt and seam-half for joinder to a seam-half on the opposite end of the belt.

FIG. 2 is a cross-sectional, side elevation of a seam construction of the invention, shown closed in part.

FIG. 3 is a plan view of the seam-halves of a corrugator belt seam showing alignment before insertion of a pintle.

FIG. 4 is a fragmentary surface view of the embodiment seam construction shown in FIG. 5.

FIG. 5 is a view along lines 5—5 of FIG. 4.

DETAILED DESCRIPTION OF THE PREFERRED EMBODIMENTS OF THE INVENTION

Figure 6:
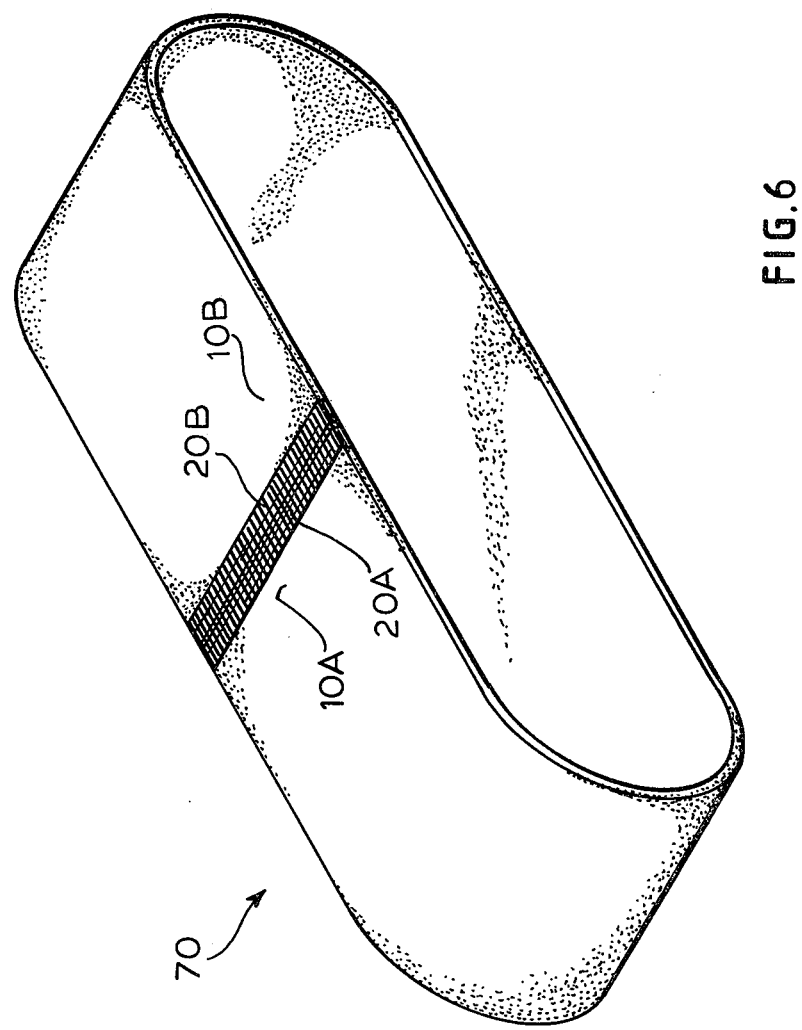
FIG. 6 is an isometric view of a corrugator belt seamed by the method of the invention.

Those skilled in the art will readily appreciate the invention from the following discussion of the preferred embodiments when read in conjunction with the accompanying drawings of FIGS. 1 through 6, inclusive.

Referring first to FIG. 1, there is seen a cross-sectional, enlarged side elevation of the end of a corrugator belt fabric end 10A attached to a seam-half 20A. The fabric of the corrugator belt is a multi-layer fabric. The upper surface of the fabric consists of a single layer 12 of non-woven textile fibers (multiple layers may be used) needled to the base or woven core 15 of the fabric 10A. A similar layer 14 of non-woven, textile fibers is needled to the woven core 15, on the lower surface. The thickness of the fabric 10A is advantageously within the range of from about 0.3 inches to about 0.4 inches and the weight of the layers 12, 14 needled to core 15 is advantageously within the range of 10 to 20 oz./sq. ft. The textile fibers of layers 12 and 14 may be natural or synthetic staple fibers such as textile fibers of polyester, polyamide, polyacrylic, wool and the like fibers and blends thereof. Those skilled in the art will appreciate that the degree of softness desired in the fabric outer surface may be controlled by selection of particular fibers and their density in the layers 12, 14.

As shown in FIG. 1, the base or core 15 of the fabric end 10A (and of the whole fabric) consists of a 4-layer weave of lengthwise (warp) spun yarns 18 and crosswise (weft) spun yarns 16. The base 15 of interwoven spun yarns advantageously provides a high degree of stability and structural integrity to the fabric of the corrugator belt. Representative of such yarns 16, 18 are spun yarns of polyamide, polyester, polypropylene, polyimide and like textile fibers. The layers 12, 14 are integrated with the base yarns 16, 18 by needling thereto. Techniques of needling are well known in the art and details need not be recited here. The entire fabric structure of the corrugator belt shown in FIG. 1 may be characterized as a smooth faced batt-on-base of multilayer weave and is representative of one fabric conventionally used in an endless corrugator belt. The fabric may be any conventional fabric structure customarily used as a corrugator belt fabric. The fabric of end 10A may be woven on a conventional papermaker's felt loom in a single operation employing conventional technique and looms.

The density of the warp yarns 18 in the woven portion of the fabric of end 10A will depend on the size of the yarn selected and may advantageously range from between 10 to 180 warp ends to the inch. Similarly, the number of crosswise or filling yarns 16 may be between 10 to 60 yarns per inch. Generally the more open weaves are preferred for corrugator fabrics to promote the passage of moisture. The density ranges described above also assure that the sheet surface will be non-marking towards corrugated board being conveyed through the corrugator machine.

As shown in FIG. 1, the outer surface of layers 12 and 14 have been partially cut away along the fabric width to leave a "step" of the lower and upper layer on core 15. The upper and lower steps of end 10A are fitted to corresponding steps in the seam-half 20A. Each of the fabric seam-halves are 2-part woven textile webs as represented by the seam-half 20A. Each seam-half comprises an upper 21 and a lower 21' connector which are structurally independent from each other but which function together to form an "inline" seam. Each of the upper and lower connectors 21, 21' contain first, second and third warp systems and a single filling system. Hence in the Figures the first, second and third warp systems of upper connector 21 in seam-half 20A are respectively indicated by the numerals 26, 28 and 30 and the filling by the numeral 32. The lower connector 21' includes corresponding warp and filling yarns 26', 28', 30' and 32'.

FIG. 2 is a cross-sectional, side elevation of the embodiment seam of the invention shown in FIG. 1, and shows the seam partially closed with the seam-half 20B on the end 10B which is the opposite of end 10A of the corrugator fabric. Ends 10A and 10B are identical in construction as are seam-halves 20A and 20B and are numbered accordingly.

The first and second warp systems in each connector 21, 21' of seam-halfs 20A, 20B provides with the filling of that seam-half connector, back and face weaves. The seam-halves 20A, 20B are constructed so that connector 21 in each half with warp systems 26 and 28 provides with filling 32 back and face weaves overlying for a portion and the third warp system 30 binding these together in the zone of overlying to provide a double layer. The corresponding, same construction is found in connector 21' of each seam-half. In each seam-half the zone where the face and the back weave overly is a double layer zone of outer and inner layers and the face and back weave are maintained in position in this zone by the third warp system. The filling system during weaving is formed over an edge cord (not shown) to provide the stepped configuration with protruding loops along the double layer edge where the filling system is folded. The loops 40, 40' (see FIG. 2) so formed are vertical to the plane of the seam-half or web through which the pintles 42, 42' can be inserted; see FIG. 5. In FIG. 2, the lower connectors 21' on each of seam-halves 20A and 20B are shown joined by pintle 42' while the connectors 21 remain open in the upper portion of the seam-halves 20A and 20B. This provides a means to mesh opposing loops 40 and 40' and provides a positive lock upon joining by pin insertion to make the corrugator fabric endless. During weaving of the seam-half connectors 21, 21' heat can be applied to heat set the filling loops 40, 40' as they are formed over the edge cord.

The yarns employed in the construction of the seam-halves 20A, 20B may be any conventional yarns such as multifilament or spun yarns of polyamides, polyesters, polyaramid and like fibers. The filling yarns 32, 32' in the preferred embodiment is a four-carrier braid with a core yarn to add strength and prevent elongation. The double layer area of the connector 21, 21' web is a double plain weave bound together by the third warp system, all of which are integrally woven together with the single layer side of the web. All edges are woven in and cannot unravel.

The loom used to weave the connectors of seam-halves 20A, 20B may be a conventional narrow fabric webbing loom as known in the narrow fabric industry. The edge cord diameter can be varied to vary the loop diameter if desired. A chemical treatment can be applied, if desired, to the filling yarns 32, 32' before, during or after weaving in order to lend stiffness and physical integrity to the loops 40, 40'.

The attachment of the connectors 21, 21' of the seam-half 20A or 20B to the 10B is accomplished as shown in FIGS. 1 and 2. During weaving of the connectors 21, 21', the inner layer of the double layer zone of connectors 21, 21' seam-half 20A is eliminated to form a step, reversed to the steps of end 10A formed by removal of portions of non-woven webs 12, 14. The steps in end 10A and seam-half connectors 21 and 21' are formed to mate and interlock to form a zone of attachment which has a thickness about equal to the thickness of the fabric making up the corrugator belt. With the steps of end 10A and connectors 21, 21' abutting as shown in FIG. 1, the layers of each step are attached by stitching 44. As shown, two rows of stitching are used, but preferably four rows of stitching are used. The seam-half 20B is similarly attached to end 10B as shown in FIG. 2. As also shown in FIG. 2, connector 21' of seam-half 20A is joined in line with connector 21' of seam-half 20B by pintle 42' inserted through the intermeshed loops 40' of each connector 21'. This is the first stage in assembly of the seam of the construction, the connectors 21 being in an open position.

FIG. 4 is a fragmentary surface view of the embodiment seam construction shown in FIG. 5 and shows further details of the seam construction.

FIG. 5 is a view along lines 5—5 of FIG. 4 and shows further details of the seam of the invention with both top and bottom connectors 21, 21' in each seam-half 20A, 20B closed by pintles 42, 42'. Optional divider fabric 60 is shown in FIG. 5 loosely positioned between connectors 21, 21' (fabric 60 is not shown in FIG. 4). The divider fabric 60 is a protective buffer piece between the connectors 21, 21' and controls the air permeability of the seam area. Those skilled in the art observing FIG. 5 will appreciate the perfect symmetry of the seam construction of the invention. This symmetry contributes in part to the stability and long life of the seam construction.

The following example describes the manner and process of making and using the invention and sets forth the best mode contemplated by the inventors of carrying out the invention but is not to be construed as limiting.

EXAMPLE 1

There is provided a quantity of spun polyester staple yarns. There are also provided webs of non-woven polyester fibers. The spun staple yarns are woven together in a 4-layer pattern, i.e.; a double system of filling with a double system of warp yarns to form a 4-layer base. Each "end" (warp) runs the length of the fabric. The non-woven webs are needled on the top and bottom of the woven staple yarns so as to sandwich them.

The product fabric is laid on a workbench and the needled web surfaces cut out along the entire width of the two ends of the fabric to form a ¾ inch wide step.

Four seam-half connectors are woven as described above with a ¾ inch wide step in one end from 0.020 inch diameter polyaramid (Nomex, supra.) spun yarns with a filling yarn of multifilament polyaramid yarn to a width of 1⅜ inches wide. With the single layer zone (step) side up, each of two connectors 21 are laid out with loop sides abutting each other. The loops are intermeshed and joined by insertion of an 0.082 inch joining cable. The joined connectors of the seam-halves are trimmed to a width equal to the corrugator fabric width plus 6 inches. The fabric of the connectors 21 is pinned to the work table and the loops tensioned. The loops are doped and allowed to dry. Alignment marks "A" and "B" are made on the joined seam-halves as shown in FIG. 3, a plan view of the approximated connectors 21 of seam-halves 20A, 20B and the joining cable removed. This procedure is then repeated with the remaining two connectors (connectors 21'). The seam-half connectors 21, 21' are then mated (step area with step area) with the stepped ends of the corrugator fabric and, using the alignment marks A and B to maintain alignment, the connectors are secured by stitching (preferably 4 rows of straight stitching with nylon, polyester or Nomex thread). The corrugator fabric may then be made endless by joining the seam-halves 20A, 20B through pintles 42, 42' inserted through the intermeshed loops 40, 40'. The edges may be trimmed, to obtain a corrugator belt 70 as shown in FIG. 6. When installed on a corrugator machine as a corrugator belt, the fabric performs well in the manufacture of combined board. The belt tracks well, is easily guided and exhibits a long life. The overall width of the seam construction on each end of the fabric is about 1⅜ inches. This width is advantageous for long life of the fabric.

Those skilled in the art will appreciate that many modifications to the above-described preferred embodiments may be made without departing from the spirit and the scope of the invention. For example, the step area in the multilayered fabric was created by cutting away layers of the fabric in ends 10A, 10B. It will be appreciated that the multilayered fabric ends 10A, 10B may have the step formed therein during the course of their being woven on the loom.

What is claimed:

1. A seam construction joining together two ends of a multilayered corrugator belt fabric, which comprises;
    a first end and a second end of a multilayered corrugator belt fabric, said multilayers including an upper layer and a lower layer, said ends each having an upper and a lower step therein by absence of portions of said upper and lower layers, each step being of a size adapted to mate with a corresponding step in a fabric seam-half connector described below;
    a first fabric seam-half upper connector attached to the first end upper step, second fabric seam-half upper connector attached to the second end upper step,
    a first fabric seam-half lower connector attached to the first end lower step, and a second fabric seam-half lower connector attached to the second end lower step,
    said connectors each containing first, second and third warp systems and a single filling system, the first and second warp systems respectively providing with the filling, face and back weaves, the face weave covering the back weave for a portion thereof providing a double layer zone of an outer layer and an inner layer and the third warp system binding the face and back weaves together in the double layer zone, and the filling system woven in the folded position along an edge to enable said face weave to cover said back weave and to form alternately displaced protruding loops along said edge for intermeshing with like loops formed along the edge of the other of the first and second seam-half connectors attached to a corresponding step for receipt of a pintle through the intermeshed loops, each of the seam-half connectors having a step therein along the side opposite to the protruding loops, said step being effected by the absence of a portion of said inner layer of the double layer zone, each seam-half connector step being of a size adapted to mate with a corresponding step in one of the ends;
    said seam-halves being joined by a pintle through the intermeshed loops of each of the upper and lower connectors;
    the upper step of the first end being joined to the opposite step of the first fabric seam-half upper connector, the upper step of the second end being joined to the opposite step of the second seam-half upper connector, the lower step of the first end being joined to the opposite step of the first fabric seam-half lower connector and the lower step of the second end being joined to the opposite step of the second fabric seam-half lower connector;
    said seam construction having a thickness about equal to the thickness of the corrugator belt fabric.

* * * * *